US010201129B2

(12) United States Patent
Demon et al.

(10) Patent No.: US 10,201,129 B2
(45) Date of Patent: Feb. 12, 2019

(54) BALER WITH IMPROVED CROSS MEMBER FOR MOUNTING THE GEARBOX (71) Applicant: CNH Industrial America LLC, New Holland, PA (US)

(72) Inventors: Frederik Demon, Bruges (BE); Patrick Delaere, Aalter (BE); Xavier G. J. M. Bonte, Sint Kruis (NL)

(73) Assignee: CNH Industrial America LLC, New Holland, PA (US)

( * ) Notice: Subject to any disclaimer, the term of this patent is extended or adjusted under 35 U.S.C. 154(b) by 195 days.

(21) Appl. No.: 15/500,395

(22) PCT Filed: Jul. 23, 2015

(86) PCT No.: PCT/EP2015/066909
§ 371 (c)(1),
(2) Date: Jan. 30, 2017

(87) PCT Pub. No.: WO2016/016095
PCT Pub. Date: Feb. 4, 2016

(65) Prior Publication Data
US 2017/0215343 A1 Aug. 3, 2017

(30) Foreign Application Priority Data
Jul. 30, 2014 (BE) .................................... 014/0592

(51) Int. Cl.
*B62D 21/18* (2006.01)
*A01F 15/08* (2006.01)
*B30B 9/30* (2006.01)

(52) U.S. Cl.
CPC .......... *A01F 15/08* (2013.01); *A01F 15/0841* (2013.01); *B30B 9/306* (2013.01)

(58) Field of Classification Search
CPC ....... A01F 15/08; A01F 15/0841; B30B 9/306
USPC ...................................... 180/312; 100/43, 45
See application file for complete search history.

(56) References Cited

U.S. PATENT DOCUMENTS

| 4,062,172 | A | * | 12/1977 | Rice | .................... A01F 15/0705 |
| | | | | | 100/77 |
| 4,503,762 | A | * | 3/1985 | Naaktgeboren | ..... A01F 15/0858 |
| | | | | | 100/4 |
| 4,525,991 | A | * | 7/1985 | Naaktgeboren | ........ A01D 90/02 |
| | | | | | 100/189 |
| 5,123,338 | A | | 6/1992 | Mathis | |

(Continued)

FOREIGN PATENT DOCUMENTS

DE 19748748 A1 5/1999
EP 0346586 A2 12/1989
(Continued)

*Primary Examiner* — Toan C To
(74) *Attorney, Agent, or Firm* — Peter K. Zacharias (57) ABSTRACT

A baler having a longitudinal direction and a transverse direction. The baler includes a frame, a gearbox, and a cross member extending in the transverse direction for coupling a top part of the gearbox to the frame. The cross member has a first end coupled to the frame and a second end coupled to the frame. The top part is coupled to the cross member between the first end and the second end. The frame is provided with a first mounting bracket and a second mounting bracket adapted for receiving the first end and the second end, respectively, in a weld-free way.

19 Claims, 5 Drawing Sheets

(56) References Cited

U.S. PATENT DOCUMENTS

| | | | | |
|---|---|---|---|---|
| 5,488,883 | A | * | 2/1996 | McMillen ............ A01F 15/085 100/88 |
| 5,661,961 | A | * | 9/1997 | Westhoff ............... A01F 15/106 100/88 |
| 6,050,052 | A | * | 4/2000 | Herron ................ A01F 15/0715 53/118 |
| 6,247,291 | B1 | * | 6/2001 | Underhill ............ A01F 15/0715 242/598.5 |
| 6,272,825 | B1 | * | 8/2001 | Anderson ............ A01F 15/085 100/88 |
| 6,457,405 | B1 | * | 10/2002 | Lippens .............. A01F 15/0825 100/192 |
| 2002/0108509 | A1 | | 8/2002 | Leupe et al. |
| 2014/0158002 | A1 | | 6/2014 | O'Reilly |
| 2017/0332557 | A1 | * | 11/2017 | Verhaeghe ............ A01F 15/042 |

FOREIGN PATENT DOCUMENTS

| | | |
|---|---|---|
| EP | 0819374 A1 | 1/1998 |
| EP | 0857414 A1 | 8/1998 |
| EP | 0908089 A1 | 4/1999 |
| EP | 0951988 A2 | 10/1999 |
| EP | 1060652 A1 | 12/2000 |
| EP | 1066747 A1 | 1/2001 |
| EP | 1066748 A1 | 1/2001 |
| EP | 2502485 A1 | 9/2012 |
| FR | 2643785 A1 | 9/1990 |
| FR | 2684517 A1 | 6/1993 |
| WO | 2011098572 A1 | 8/2011 |

\* cited by examiner

BALER WITH IMPROVED CROSS MEMBER FOR MOUNTING THE GEARBOX

CROSS REFERENCE TO RELATED APPLICATION

This application is the National Stage of International Application No. PCT/EP2015/066909 filed Jul. 23, 2015, which claims priority to Belgium Patent Application No. 2014/0592 filed Jul. 30, 2014, the contents of which are incorporated herein by reference.

FIELD OF THE INVENTION

The present invention relates to balers comprising a frame, a gearbox, and a cross member extending in the transverse direction for coupling a top part of the gearbox to the frame. More in particular the invention relates to rectangular balers provided with a heavy gearbox.

BACKGROUND OF THE INVENTION

In prior art balers a top fork-like part of the gearbox is connected via a pin to a coupling flange which is welded to a cross member extending in a transverse direction of the baler, and the cross member is welded to the frame of the baler. Such a prior art baler will be discussed in detail below with reference to FIG. 1 and FIG. 2.

In such an embodiment the assembly of the cross member and gearbox involve a lot of machining and welding, resulting in an expensive construction. Misalignments in the transverse direction can be taken up by the parts during assembly.

In prior art embodiments heavy loads on the gearbox are not dealt with in an optimal way, and may result in high local stresses in the cross member.

SUMMARY OF THE INVENTION

The object of the present invention is to provide a baler in which the forces exerted on the gearbox can be transferred by the cross member to the frame through a more cost efficient construction, whilst allowing to take up any misalignments in the transverse direction.

According to an aspect of the invention, there is provided a baler having a longitudinal direction extending in the traveling direction of the baler, and a transverse direction. The baler comprises a frame, a gearbox, and a cross member extending in the transverse direction for coupling a top part of the gearbox to the frame. The cross member has a first end coupled to the frame and a second end coupled to the frame, and the top part of the gearbox is coupled to the cross member between said first end and said second end. The frame is provided with a first and a second mounting bracket adapted for receiving the first end and said second end, respectively, such that the first end and the second end of the cross member is coupled to the frame in a weld-free way.

Embodiment of the invention are based inter alia on the insight that by using mounting brackets misalignments in the transverse direction can be dealt with, and forces can be transferred in an improved way with less high local stresses in the cross member, to the frame. Moreover, the assembly of the cross member through mounting brackets is more cost-effective.

In a preferred embodiment the first end and the second end have a circumferential surface which is at least partially cylindrical around an axis parallel to the transverse direction of the baler, and the first and a second mounting bracket have an at least partially cylindrical mounting surface adapted for receiving said first end and said second end, respectively. The radius of the cylindrical surface may vary in the transverse direction. Preferably the circumferential surface is at least partially circularly cylindrical. Such a cylindrical contact surface between the first and second end and the first and second mounting bracket has the advantage that a good contact can be achieved over a large enough surface area so that forces can be transferred adequately to the frame.

In a preferred embodiment the first end and the second end of the cross member is coupled to the frame in a weld-free way, without vertical bolts extending through the first and second end. In other words, it is preferred not to use vertical bolts for transferring high forces to the frame. There may be used a pushing or pulling member, such as a pushing or pulling bolt, for maintaining the first and second ends in their position in the first and second mounting brackets, but such a member does not have a significant force transferring function.

In a preferred embodiment the first and second end have a vaulted outer surface seen in the transverse direction of the baler. In case of a cylindrical outer surface, this implies that the radius of the cylindrical outer surface will not be constant in the transverse direction. Such a vaulted outer surface has the advantage that also in case of bending or misalignment of the cross member a good contact between the first and second mounting bracket and the first and second end can be guaranteed.

In a preferred embodiment the first and second mounting bracket have a near side and a far side, said near side being closer to the gearbox than said far side. The first and second end may have a portion with a cylindrical outer surface which portion is located at the near side of the first and second mounting bracket, such that it is adapted for transferring forces exerted by the gearbox on the cross member in the traveling direction of the baler, to the frame.

In an exemplary embodiment the cross member has a substantially H shaped cross section, and the first and second ends of the cross member each have a first flange and a second flange and a middle part connecting the first flange with the second flange. Preferably the first flange has a rounded outer surface, and each mounting bracket has a complementary rounded mounting surface cooperating with the rounded outer surface of said first flange. With a substantially H shaped cross section is meant that the cross section is H-shaped over a large portion of the length of the cross member. More in particular, the cross member may have a small cylindrical part, e.g. in the middle of the cross member for facilitating the connection with a coupling flange, see further. Further, the flanges of the H do not need to be flat but may be rounded.

In another exemplary embodiment the cross member has a substantially cylindrical shape. The radius of the cylindrical cross member may vary in the transverse direction and will typically be larger in the middle of the cross member than at the first and second end.

In a preferred embodiment the cross member is provided with a coupling flange extending perpendicular on the transverse direction of the baler. The coupling flange is coupled with the top part of the gearbox.

In an exemplary embodiment the cross member and the coupling flange are made as a single piece, e.g. a cast piece. In another exemplary embodiment the coupling flange is a separate member which is clamped on the cross member in a weld-free manner.

In a preferred embodiment the coupling flange is provided with a through-opening extending in the transverse direction, and a pen extends through the through-opening connecting the top part of the gearbox with the cross member. More preferably, a ball having a through-opening is inserted in the through-opening of the coupling flange, and the pen extends through the through-opening of the ball. In this manner a ball pivot is obtained, further improving the transfer of forces to the cross member.

In a preferred embodiment the first and second mounting bracket are welded to the frame.

According to a second aspect of the invention there is provided a baler having a longitudinal direction extending in the traveling direction of the baler, and a transverse direction. The baler comprising a frame, a gearbox, and a cross member extending in the transverse direction and having a first end coupled to the frame and a second end coupled to the frame, wherein a top part of the gearbox is coupled to the cross member between said first end and said second end. The cross member is provided with a coupling flange extending perpendicular on the transverse direction, wherein the coupling flange is coupled with the top part of the gearbox, and wherein the coupling flange is clamped on the cross member in a weld-free manner.

The baler of the second aspect has the advantage that the shape of the cross member can be more simple whilst the forces from the gearbox can be transferred efficiently to the frame.

According to the second aspect the first and second ends of the cross member may either be mounted with mounting brackets as in the first aspect of the invention, or may be connected by other means to the frame, such as by bolts or by welding.

In a preferred embodiment the cross member has a cylindrical part between the first end and the second end, and the coupling flange has a cylindrical inner surface in contact with the cylindrical part of the cross member.

In an exemplary embodiment the coupling flange is a single piece with an opening having dimensions corresponding with the dimensions of the cross section of the cross member such that the cross member can be arranged through said opening in order to clamp the coupling flange on the cross member. In another exemplary embodiment the coupling flange comprises two parts which are connected to each other around the cross member.

The features disclosed above for the baler of the first aspect of the invention may be equally applied for the baler according to the second aspect.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein.

DETAILED DESCRIPTION OF EMBODIMENTS

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention can be used in agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Figure 1:
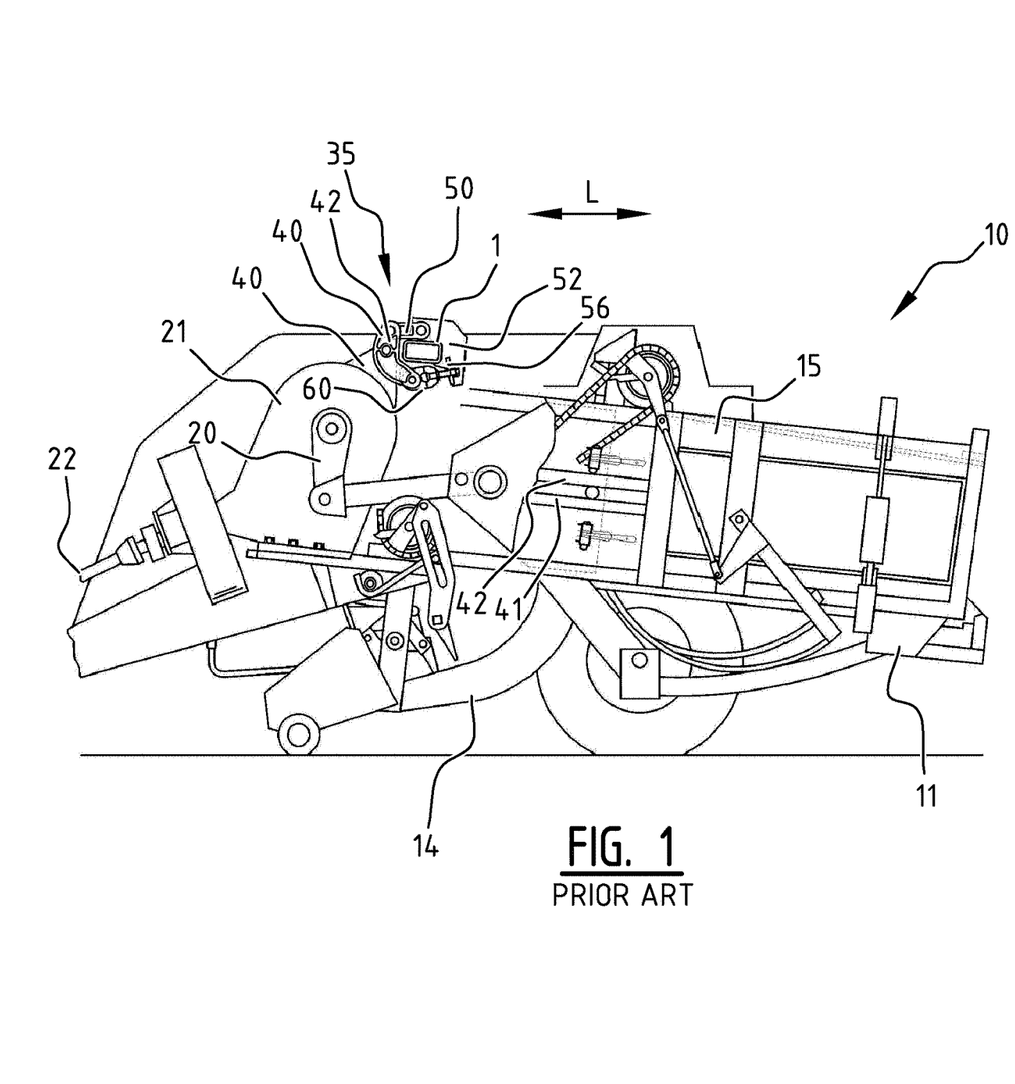
FIG. 1 is a schematic side view of a prior art rectangular baler.
Figure 2:
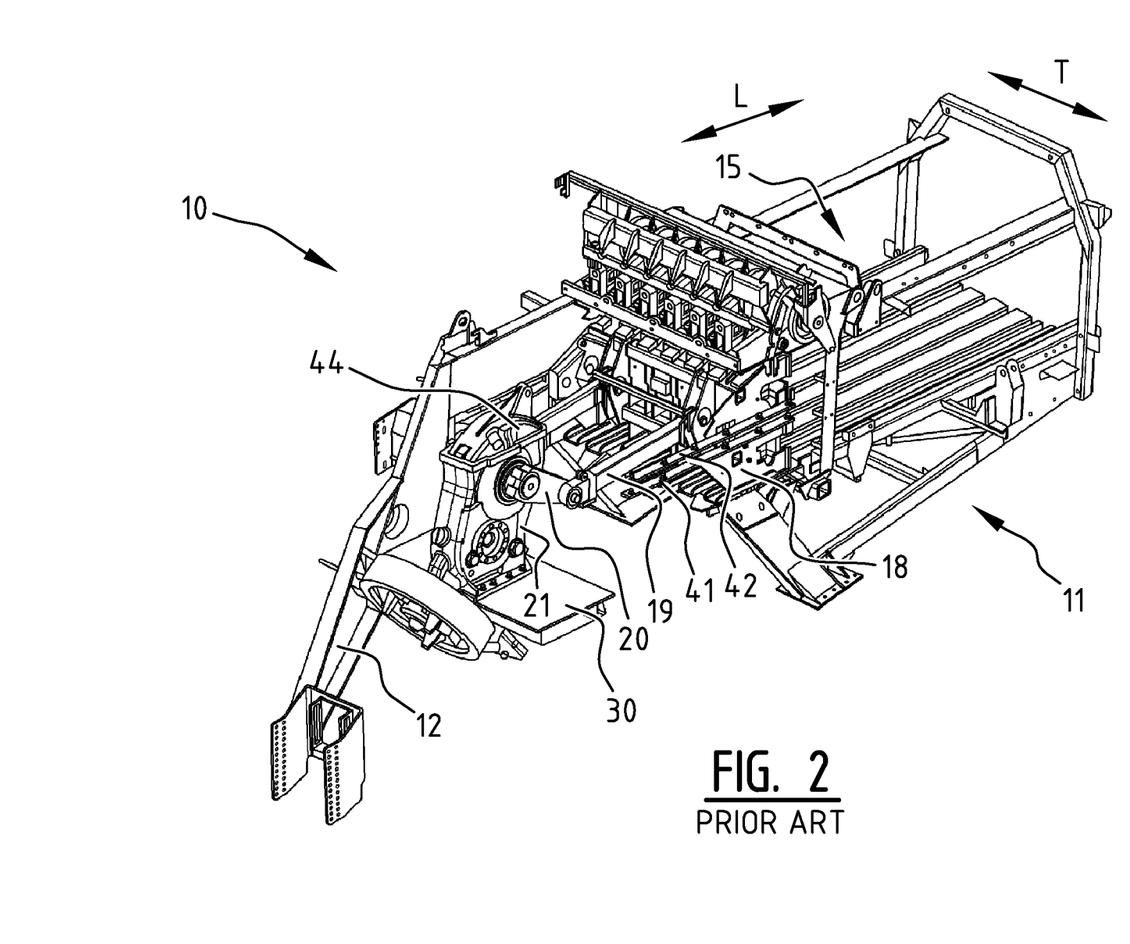
FIG. 2 is a schematic perspective view of a prior art rectangular baler.

Part of an agricultural baler 10 of the prior art is illustrated in FIG. 1 and FIG. 2. Baler 10 has a longitudinal direction L extending in the traveling direction of the baler, and a transverse direction T. The baler 10 comprises a main frame 11 onto which all parts are mounted. The frame 11 of the baler 10 is typically a welded construction.

The baler 10 comprises a baling chamber 15. A carrying member 30 carries a lower part of a gearbox 21 of the baler 10. Typically, the baling chamber 15 is positioned in line with the carrying member. The gearbox 21 provides actuation of the different parts of the baler 10 that need to be actuated. The gearbox 21 may be actuated by the tractor pulling the baler 10 by means of a transmission shaft 22 between the tractor and the baler 10, as illustrated in FIG. 1. The gearbox 21 provides a direct actuation of the plunger 18. Hereto, the plunger 18 may for example be connected to the gearbox 21 by means of crank arms 20 and pitman rods 19. The plunger 18 presses the collected crop material obtained from the feeder duct 14 against the bale being formed in the baling chamber 15. The plunger 18 moves on and against bottom plunger rails 41 which are provided for that purpose at both sides of the baling chamber 15, at right and left hand chamber walls. Top plunger rails 42 may optionally also be provided for forcing the movement of the plunger 18 onto the bottom plunger rails 41 and for restricting the movement of the plunger 18, thus preventing that the plunger 18 moves up and down.

The gearbox 21 is affixed at its lower section to the carrying member 30. The top portion of the gearbox is held in place by a linkage and sensor assembly 35 connecting the top portion to a cross member 1. The linkage assembly 35 is designed to withstand the reaction forces of the plunger 18 on the body of the gearbox 21. It comprises a lever 40 which is mounted by a transverse cylindrical pin 42 to a flat protrusion 44 on the upper housing portion of the gearbox 21. The linkage assembly 35 further comprises a pull member 50 having a front end which is pivotally connected to the upper arm of the lever 40. The rear end of the pull member 50 is mounted between a pair of upright support plates 52 which are welded to the cross member 1 of the main frame 11. The support plates 52 have portions extending over and below cross member 1 and between which a transverse bracket plate 56 is welded. This plate 56 is facing the lower end of the lever 40. A bolt extends through a hole in the plate 56 and into the rear portion of a bearing block 60. At its front end the block 60 holds a spherical bearing which is mounted between the lower ends of the lever 40. A load sensor is inserted through holes in these lower ends and through the bearing. The load sensor is operable to sense the force exerted by the lever 40 on the bracket plate 56. Preferably, the sensor senses the force in a substantially longitudinal direction.

During each compression stroke of the plunger 18, the reaction forces of the crop material upon the plunger 18 are transmitted by the pitman rod 19 and the crank arm 20 upon the gearbox 21. Part of these forces is assumed by the attachment of the lower part of the gearbox 21 to the main frame 11. The remainder of the reaction forces is assumed by the linkage assembly 35 at the top part of the gearbox 21.

Figure 3:
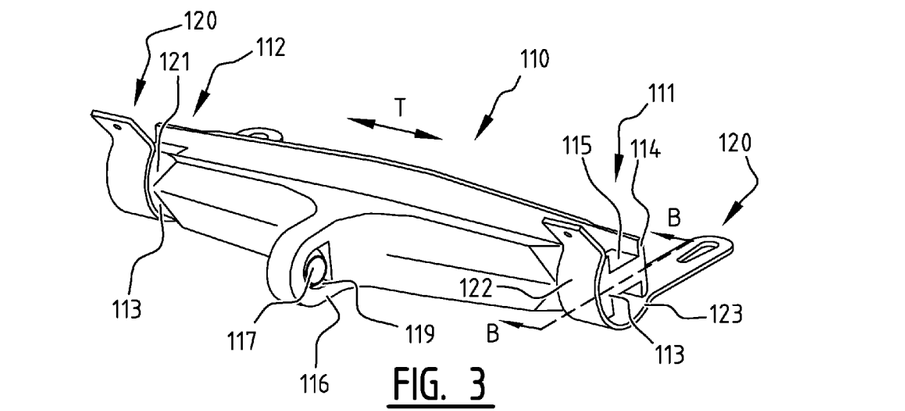
FIG. 3 is a schematic perspective view of a first embodiment of a cross member with mounting brackets of the invention.
Figure 3A:
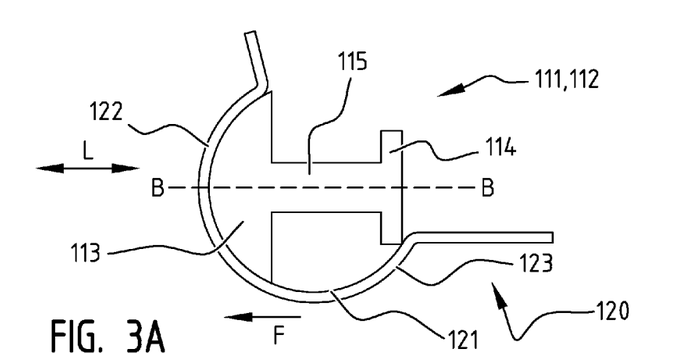
FIG. 3A is a cross section along line A-A across an end part of the cross member with mounting brackets of FIG. 3.
Figure 3B:
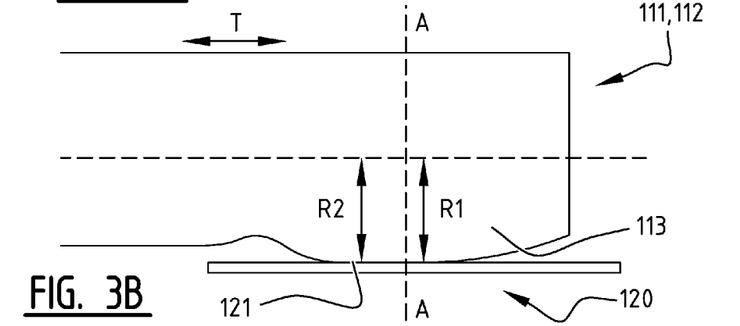
FIG. 3B is a partial section along line B-B of the cross member with mounting brackets of FIG. 3.

Now a cross member 110 with corresponding mounting brackets 120 according to a first embodiment of the invention will be illustrated referring to FIG. 3, FIG. 3A and FIG. 3B.

The cross member 110 has a first end 111 and a second end 112. The first end 111 and the second end 112 are received in a first and second mounting bracket 120, such that the first end and the second end of the cross member is coupled to the frame in a weld-free way. The mounting brackets 120 can be welded or otherwise fixed to the frame 11 of the baler 10. A top part 40 of a gearbox 21 is coupled to the cross member 110 between the first end 111 and the second end 112.

The first end 111 and the second end 112 comprise a part 113 having a circular cylindrical outer surface, wherein the axis of the cylindrical outer surface extends in the transverse direction of the baler. The radius R1, R2 may vary in the transverse direction, see FIG. 3B. Each mounting bracket 120 has an a cylindrical mounting surface 121, i.e. the inner surface of the bracket 120, which is adapted for receiving said first end and said second end, respectively.

Preferably, the part 113 has a vaulted outer surface seen in the transverse direction T of the baler, whilst the mounting bracket 120 has a straight cylindrical outer surface seen in the transverse direction T. The mounting bracket 120 has a near side 122 and a far side 123, said near side 122 being closer to the gearbox 21 than said far side 123. The part 113 is located at the near side 122 of the mounting bracket 120. In that way the part 113 is adapted for transferring forces F exerted by the gearbox 21 on the cross member 110 in the traveling direction of the baler, to the frame 11. Because of the vaulted form of the part 113, the forces can be well transferred, also when the cross member is subject to bending forces.

The cross member 110 has a substantially H shaped cross section, wherein the first and second end parts of the cross member each comprise the part 113, a second flange part 114 and a middle part 115. The middle part 115 connects the first flange part 113 with the second flange part 114.

The cross member 110 is provided with a coupling flange 116 extending in the longitudinal direction L of the baler 10 between the first end 111 and the second end 112, typically centrally between the first end 111 and the second end 112. In the first embodiment the cross member 110 and the coupling flange 116 are made as a single piece, e.g. a cast piece. The coupling flange 116 is meant to be coupled with a top fork part 44 of the gearbox 21. More in particular, the flange 116 is meant to fit between the fork legs of top part 44, and a pen 42 extends through the fork part 44 and through a ball 117 in a through-opening 119 of the flange 116, such that the ball 117 and through-opening 119 form a ball joint. The ball 117 can be placed in the through-opening 119 in a rotated position (with the through-opening therein extending in the longitudinal direction L), whereupon the ball 117 can be rotated into position with the through-opening therein extending in the transverse direction T. The pen 42 extends through the through-opening of the ball 117. In that manner the forces on the gear box 21 can be transferred to the cross member 110 whilst limiting high localized stresses in the cross member.

Figure 4:
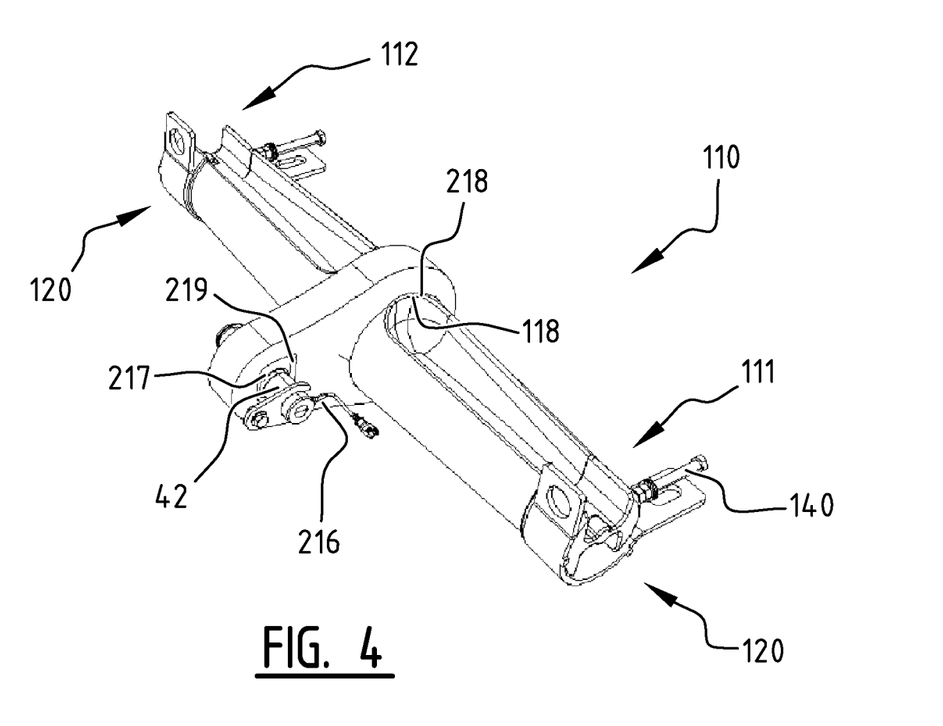
FIG. 4 is a schematic perspective view of a second embodiment of a cross member with mounting brackets of the invention.

FIG. 4 illustrates a second embodiment of a cross member 110 with corresponding mounting brackets 120. The cross member 110 has a first end 111 and a second end 112. The first end 111 and the second end 112 are received in a mounting bracket 120, such that the first end 111 and the second end 112 of the cross member is coupled to the frame in a weld-free way. Also, the connection is free from shear and friction force transferring bolts which extend vertically through the cross member. However, there may be provided a pushing member, such as a push bolt 140, which keeps the cross member 110 in place with its first and second ends 111, 112 received in first and second mounting brackets 120. Alternatively, there may be provided a pull member, such as a pull bolt (not shown), for maintaining in position the first and second ends 111, 112.

In the second embodiment a coupling flange 216 for coupling the cross member 110 to a gearbox is clamped on the cross member 110 in a weld-free manner. To that end the cross member 110 has a cylindrical part 118 in the middle between the first end 111 and the second end 112, and the coupling flange 216 has a cylindrical inner surface 218 in contact with the cylindrical part 118 of the cross member 110.

In the second embodiment the coupling flange 216 is a piece with a cylindrical through-hole having a diameter corresponding with the diameter of the cylindrical middle part 118 of the cross member, such that the cross member 110 can be arranged through the through-hole in order to clamp the coupling flange 216 on the cross member 110. Compared to the first embodiment the stress in the cross member 110 caused by the forces exerted by the gearbox on the cross member 110 will be more focused around the coupling flange 216. Both the first and second embodiment give results which are significantly improved compared to prior art embodiments where the cross member is welded to the frame.

Figure 5:
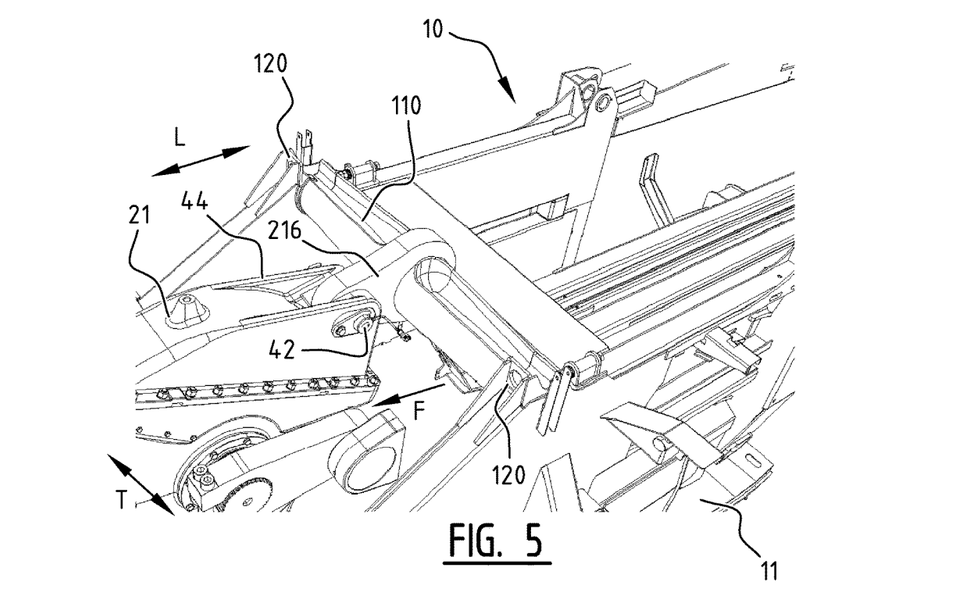
FIG. 5 is a perspective view of a part of an embodiment of a baler of the invention.

The coupling flange 216 is coupled with a top fork part 44 of the gearbox 21, see FIG. 5. More in particular, the flange 216 fits between the fork legs of top part 44, and a pen 42 extends through the fork part 44 and through a ball 217 in a through-opening 219 of the flange 216, such that the ball 217 and through-opening 219 form a ball joint. The ball 217 can be placed in the through-opening 219 in a rotated position (with the through-opening therein extending in the longitudinal direction L), whereupon the ball 217 can be rotated into position with the through-opening therein extending in the transverse direction T. The pen 42 extends through the through-opening of the ball 217. This will allow the forces on the gear box 21 to be transferred to the cross member 110 in an improved manner.

FIG. 5 illustrates the cross member 110 arranged in a baler 10 via the mounting brackets 120 of the first embodiment. The mounting brackets 120 may be welded to the respective sidewalls of the baler.

Figure 6:
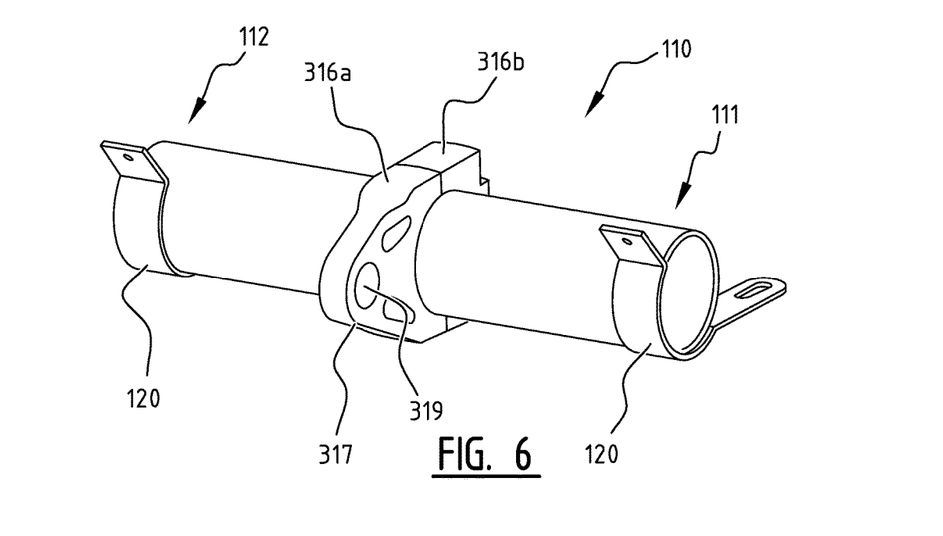
FIG. 6 is a schematic perspective view of a third embodiment of a cross member with mounting brackets of the invention.

FIG. 6 illustrates a third embodiment of a cross member 110 with mounting brackets 120. The cross member 110 has a first end 111 and a second end 112. The first end 111 and the second end 112 are received in the mounting brackets 120, such that the first end and the second end of the cross member is coupled to the frame in a weld-free way. In the third embodiment a coupling flange 316a, 316b for coupling the cross member 110 to a gearbox, is clamped on the cross member 110 in a weld-free manner.

The cross member 110 has a circular cylindrical shape over the entire length between the first end 111 and the second end 112. The coupling flange is formed by two parts 316a, 316b which are connected to each other in order to be clamped around the cross member 110. When the two parts 316a, 316b are clamped against each other, they define a cylindrical inner surface which is in contact with the cylindrical outer surface of the cross member 110.

The coupling flange 316 is meant to be coupled with a top fork part 44 of the gearbox 21. More in particular, the flange 316 is meant to fit between the fork legs of top part 44, and a pen 42 extends through the fork part 44 and through a ball 317 in a through-opening 319 of the flange 316, such that the ball 317 and through-opening 319 form a ball joint. The pen 42 extends through the through-opening of the ball 317.

While the principles of the invention have been set out above in connection with specific embodiments, it is to be understood that this description is merely made by way of example and not as a limitation of the scope of protection, which is determined by the appended claims.

The invention claimed is:

1. A baler having a longitudinal direction (L) extending in a traveling direction of the baler, and a transverse direction (T), the baler comprising:
   a frame comprising a first mounting bracket and a second mounting bracket;
   a gearbox having a top part; and
   a cross member extending in the transverse direction for coupling the top part of the gearbox to the frame, the cross member comprising a first end coupled to the frame and a second end coupled to the frame, wherein the top part is coupled to the cross member between the first end and the second end,
   wherein the first and second mounting brackets are adapted for receiving the first end and the second end, respectively, such that the first end and the second end of the cross member are coupled to the frame in a weld-free way.

2. The baler of claim 1, wherein the first end and the second end have a circumferential surface which is at least partially cylindrical around an axis parallel to the transverse direction (T) of the baler, and wherein the first and second mounting brackets have an at least partially cylindrical mounting surface adapted for receiving the first end and the second end, respectively.

3. The baler of claim 2, wherein the circumferential surface is at least partially circularly cylindrical.

4. The baler of claim 1, wherein the first and second ends have a vaulted outer surface seen in the transverse direction of the baler.

5. The baler of claim 1, wherein the first and second mounting brackets have a near side and a far side, the near side being closer to the gearbox than the far side, wherein the first and second ends have a portion with a cylindrical outer surface, the portion being located at the near side of the first and second mounting bracket, such that the portion is adapted for transferring forces (F) exerted by the gearbox on the cross member in the traveling direction of the baler, to the frame.

6. The baler of claim 1, wherein the cross member has a substantially H-shaped cross section, wherein the first and second ends of the cross member each have a first flange, a second flange, and a middle part connecting the first flange with the second flange, wherein the first flange has a rounded outer surface, and wherein the first and second mounting brackets each have a complementary rounded mounting surface cooperating with the rounded outer surface of the first flange.

7. The baler of claim 1, wherein the cross member has a substantially cylindrical shape.

8. The baler of claim 1, wherein the cross member further comprises a coupling flange extending in the longitudinal direction of the baler, wherein the coupling flange is coupled with the top part of the gearbox.

9. The baler of claim 8, wherein the cross member and the coupling flange are made as a single piece; or
   wherein the coupling flange is clamped on the cross member in a weld-free manner.

10. The baler of claim 8, wherein the coupling flange is provided with a through-opening extending in the transverse direction (T), and wherein a pen extends through the through-opening connecting the top part of the gearbox with the cross member.

11. The baler of claim 10, wherein a ball having a through-opening is inserted in the through-opening of the coupling flange, and the pen extends through the through-opening of the ball.

12. The baler of claim 1, wherein the first and second mounting bracket are welded to the frame.

13. The baler of claim 1, wherein the first end and the second end are maintained in position by a pushing member or pulling member which extends between the first end and the frame, and between the second end and the frame, and which is fixed to the frame.

14. A baler having a longitudinal direction extending in a traveling direction of the baler, and a transverse direction, the baler comprising:
   a frame;
   a gearbox having a top part; and
   a cross member extending in the transverse direction for coupling the top part of the gearbox to the frame and comprising a first end coupled to the frame and a second end coupled to the frame, wherein the top part of the gearbox is coupled to the cross member between the first end and the second end, the cross member further comprising a coupling flange extending perpendicular on the transverse direction, wherein the coupling flange is coupled with the top part of gearbox,
   wherein the coupling flange is clamped around the cross member in a weld-free manner.

15. The baler of claim 14, wherein the cross member comprises a cylindrical part between the first end and the second end, and the coupling flange comprises a cylindrical inner surface in contact with the cylindrical part of the cross member.

16. The baler of claim 14, wherein the coupling flange is a single piece with an opening having dimensions corresponding with the dimensions of the cross section of the cross member, such that the cross member can be arranged through the opening in order to clamp the coupling flange on the cross member.

17. The baler of claim 14, wherein the coupling flange comprises two parts which are connected to each other around the cross member.

18. The baler of claim 14, wherein the coupling flange comprises a through-opening extending in the transverse direction (T), and wherein a pen extends through the through-opening connecting the top part of the gearbox with the cross member.

19. The baler of claim 18, wherein a ball having a through-opening is inserted in the through-opening of the coupling flange, and the pen extends through the through-opening of the ball.

\* \* \* \* \*